United States Patent [19]

Kaestner

[11] 4,153,874
[45] May 8, 1979

[54] MOBILE PERPETUALLY SELF-CORRECTING ESTIMATED TIME OF ARRIVAL CALCULATOR

[76] Inventor: Erwin A. Kaestner, 5300 Hamilton Ave., Cincinnati, Ohio 45224

[21] Appl. No.: 827,884

[22] Filed: Aug. 26, 1977

[51] Int. Cl.² .............................................. G01P 3/56
[52] U.S. Cl. ................................................. 324/161
[58] Field of Search ............. 235/92 T, 92 CA, 91 H; 58/145 A, 152 E; 340/53, 56, 62, 263; 324/161, 166, 175

[56] References Cited

U.S. PATENT DOCUMENTS

| | | | |
|---|---|---|---|
| 3,599,154 | 8/1971 | Carol | 324/161 |
| 3,950,700 | 4/1976 | Weisbart | 324/161 |

Primary Examiner—M. Tokar
Attorney, Agent, or Firm—Melville, Strasser, Foster & Hoffman

[57] ABSTRACT

A calculator for computing the estimated time of arrival of a vehicle or the like at a desired destination. The calculator, under control of a microprocessor and related interfacing devices, computes and periodically updates the estimated time of arrival at the destination from information reflecting present chronological time, the total estimated distance and the desired average speed to be travelled to the destination, and the actual distance travelled by the vehicle. The information resulting from the microprocessor's computations is visually displayed together with the present chronological time. The calculator may also be provided with warning sensors to provide an indication when a predetermined maximum speed has been exceeded. In an alternate mode, the calculator may be caused to function as a standard four function calculator, without affecting data previously stored in the estimated time of arrival mode.

7 Claims, 3 Drawing Figures

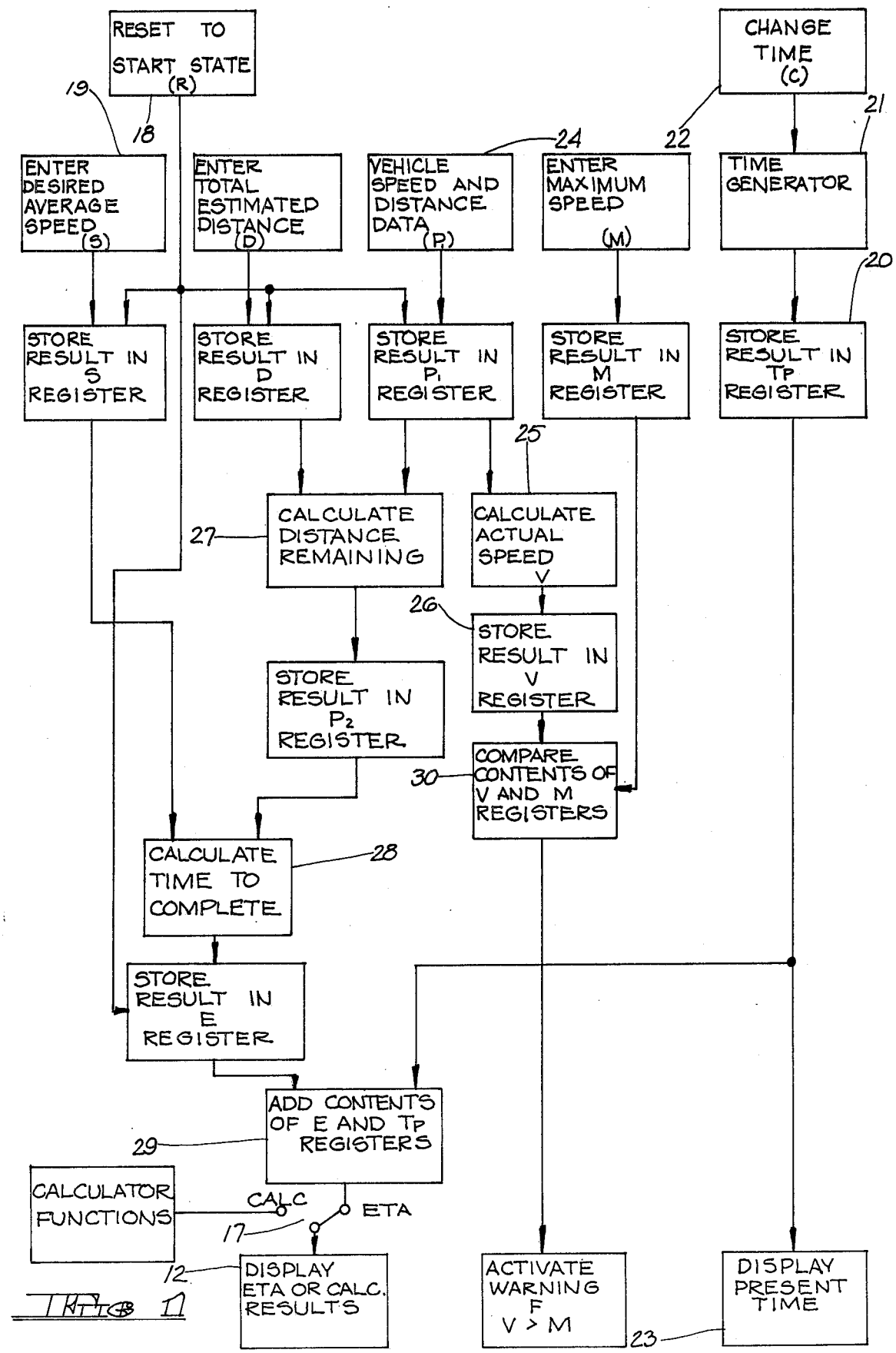

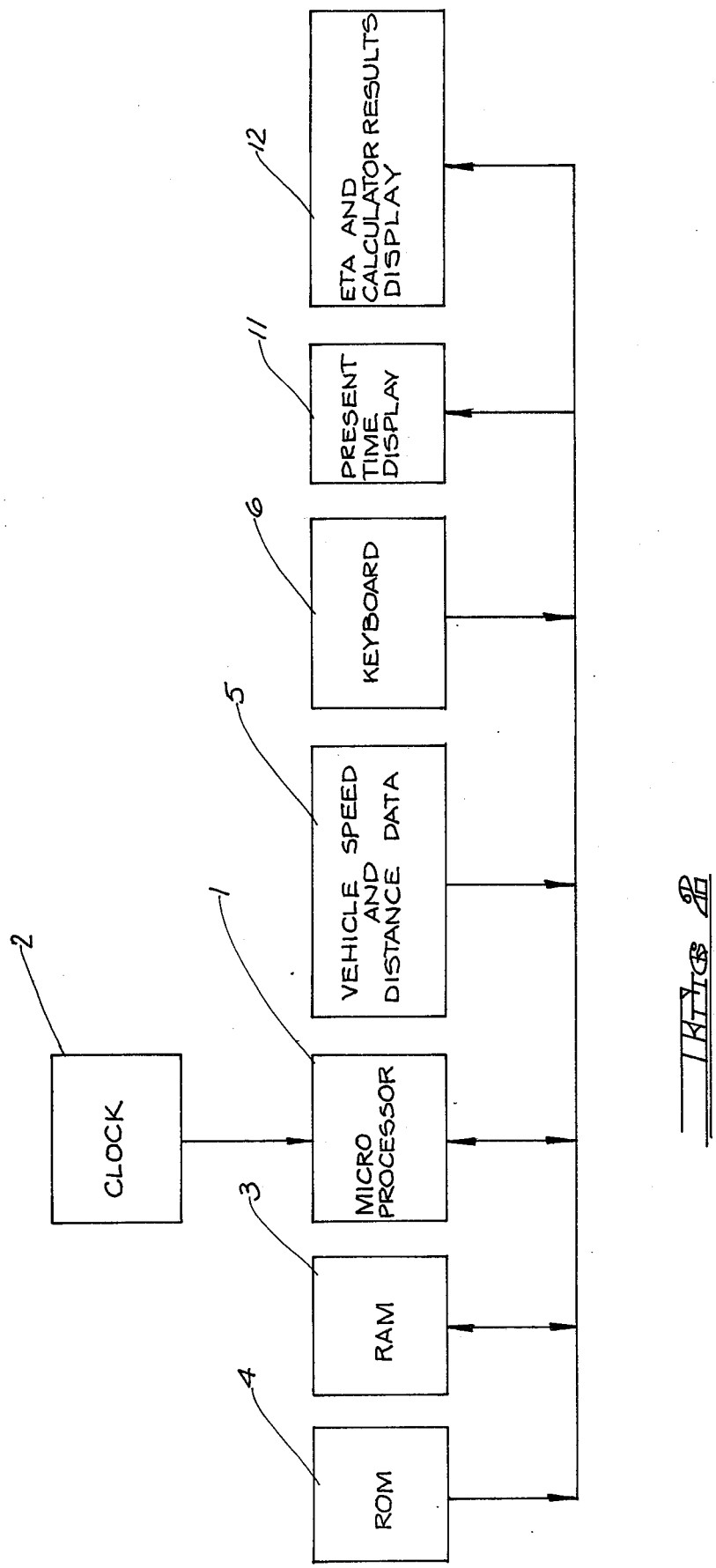

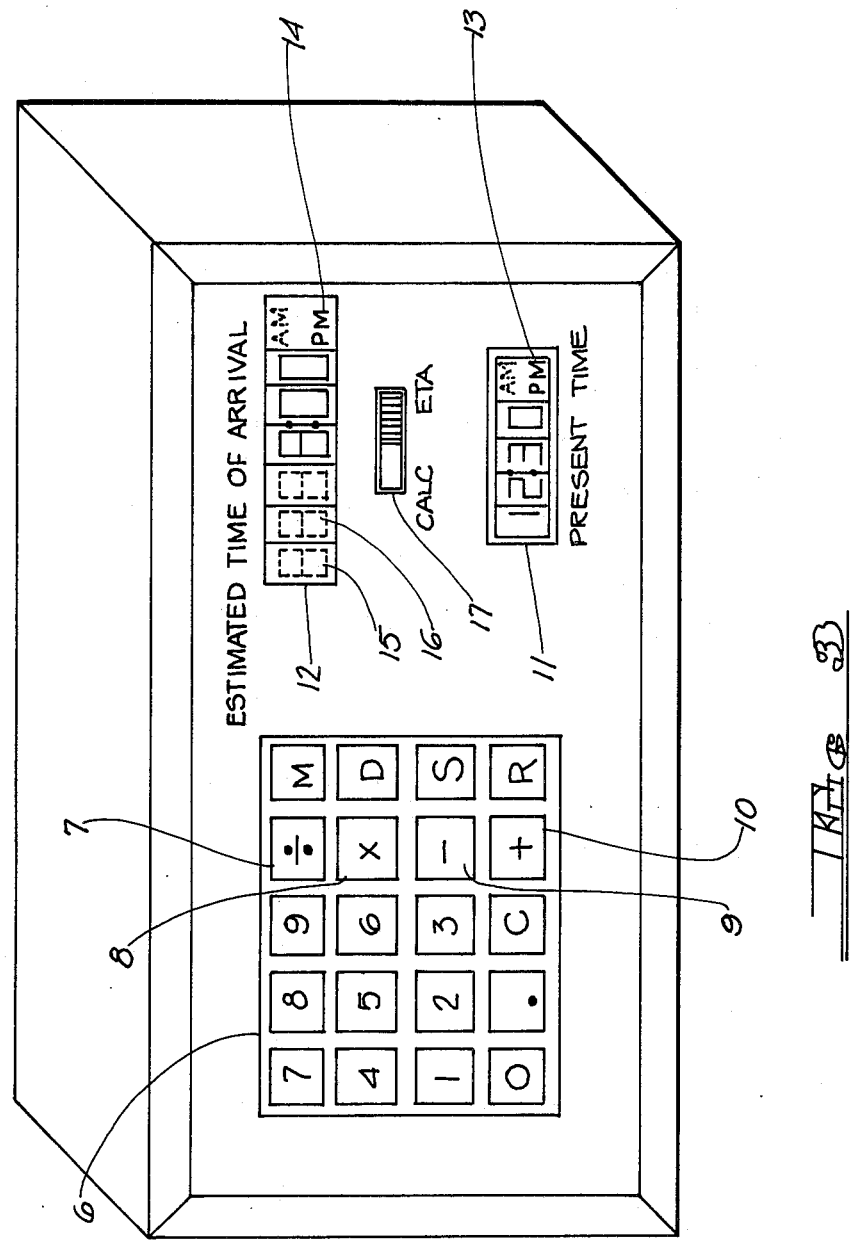

MOBILE PERPETUALLY SELF-CORRECTING ESTIMATED TIME OF ARRIVAL CALCULATOR

BACKGROUND OF THE INVENTION

1. Field of the Invention

The present invention relates generally to time indicating instruments, and more particularly to an instrument for calculating and visually displaying the estimated time of arrival at a desired destination.

2. Description of the Prior Art

In recent years, there has been a tremendous influx of electronic devices into the transportation vehicle industry for monitoring various phases of vehicle performance. For example, there now exist electronic mile-per-gallon indicators, digital clocks and speedometers.

Increased awareness of the necessity of conserving scarce natural resources has also brought about a revolution in the approach to vehicle transportation. One visible application of these conservation measures can be seen in the lowered speed limits which now exist on most public highways. The lowering of vehicle speed limits, in particular, has complicated travel schedules for a large segment of our Nomadic society. Individuals whose livelihood depends on travel, such as salesman and the like, have become concerned over the increased times required for commuting. For these persons, as well as others whose presence is required at a certain place at a certain time, the need exists for an instrument which can continuously aprise the traveler of his estimated time of arrival at a desired destination.

SUMMARY OF THE INVENTION

The present invention provides a mobile calculator, suitable for mounting on the dashboard of a vehicle or the like, which continuously computes the estimated time of arrival of the vehicle at a desired destination based upon information reflecting the total estimated distance and the desired average speed to be travelled to the destination supplied by the traveler, and from information reflecting the present chronological time and the actual distance travelled by the vehicle. The resulting estimated time of arrival is displayed together with the actual present chronological time to continually aprise the traveler of his progress toward his destination. The calculator also contains a warning mechanism to alert the operator of the vehicle if a predetermined maximum speed has been exceeded. Furthermore, in an alternate operating mode, the calculator may be operated as a conventional four function mathematical calculator.

In one preferred embodiment, the calculator comprises a box-like enclosure suitable for mounting at any convenient place within a vehicle. On the front panel of the calculator enclosure is located a 4 × 5 keyboard array which the operator uses to input data to the calculator. A separate slide switch is also provided to select the two modes of operation of the device, "Calculator" or "Estimated Time of Arrival." A numeric read-out, such as a conventional LED or LCD, provides a six digit display of calculator results when the slide switch is in the Calculator mode or a four digit estimated time of arrival display when the slide switch is in the Estimated Time of Arrival mode. A second four digit numeric display provides a continuous visual indication of present chronological time.

Sixteen of the keyboard functions make up a standard four function calculator array, i.e., numerals 0–9, decimal point, divide, multiply, add, substract and clear. In the Estimated Time of Arrival mode, the numeric functions of the keyboard are used to input speed and distance data into the calculator under the control of four additional function keys designated M (maximum speed), D (total estimated distance to destination), S (desired average speed) and R (calculator reset). In this mode, the key associated with the clear function in the Calculator mode may be used to set the proper present chronological time.

In operation, the operator selects Estimated Time of Arrival mode by means of the slide switch located on the front panel of the calculator enclosure. By depressing the C (clear) function located on the keyboard, the operator can quickly set the Present Time display to the actual present time. The various functions and values may then be programmed into the calculator by means of the keyboard. These values will be: the total estimated distance to the destination; the desired average speed to be maintained while travelling to the destination; and the maximum speed desired during the trip. Information reflecting the actual distance and speed travelled by the vehicle is supplied to the calculator by the vehicle speed and distance indicators, such as the speedometer and odometer, or a separate transducer.

After the calculator has been properly programmed, the Estimated Time of Arrival display will continuously indicate the estimated time of arrival at the desired destination based upon the programmed perimeters and the actual distance and speed travelled by the vehicle. If the vehicle should exceed the programmed maximum speed, a warning indication will be provided to the operator so that his speed may be reduce to safe limits.

BRIEF DESCRIPTION OF THE DRAWINGS

FIG. 1 is a functional flow diagram illustrating the operation of the calculator of the present invention.

FIG. 2 is a general block diagram illustrating the functional computing assemblies comprising the calculator of the present invention.

FIG. 3 is a perspective view of the enclosure and front panel of the calculator of the present invention.

DESCRIPTION OF THE PREFERRED EMBODIMENTS

The calculator of the present invention operates to compute the estimated time of arrival of a vehicle or the like at a desired destination based upon the total estimated distance and the desired average speed to be travelled to the destination selected by the operator, and also based upon the actual speed of and distance travelled by the vehicle. In an alternate operating mode, the calculator may be utilized as a standard four function mathematical calculating device, without affecting data already entered in the estimated time of arrival mode.

FIG. 2 illustrates the principle computing assemblies comprising the calculator. The assemblies are well understood by those familiar with the data processing art and need only be briefly described. Calculator computation and signal flow is under the control of microprocessor 1 which may be a CPU of the type 8080 manufactured by Intel. Processing of microprocessor 1 is controlled by clock 2 which may be type 8224 also manufactured by Intel. Associated with microprocessor 1 are one or more random access memories (RAM) 3 such as Intel type 2102 silicon gate M O S 1024 bit fully decoded static memory. Each RAM contains a plurality of storage registers for storing information under control of microprocessor 1. Microprocessor 1 may be programmed in accordance with instructions hereinafter described, and may in addition call upon read only memory (ROM) 4, which may comprise Intel type 2708 EPROM, for specific subprogram routines.

Information is supplied to the calculator by means of vehicle speed and distance data input 5 and operator addressable keyboard 6. Vehicle speed and distance data may be obtained from the vehicle speed and distance indicators, such as the speedometer and odometer, or may be supplied by a separate transducer pickup associated with one of the wheels of the vehicle, such as that described in U.S. Pat. No. 3,846,701 issued Nov. 5, 1974 to Harry R. Sampey. In general, the vehicle speed and distance data will consist of individual electrical pulses proportional to the distance travelled by and the speed of the vehicle.

The operator addressable keyboard 6 comprises a conventional 4 × 5 keyboard containing twenty individually activated functions as is best shown in FIG. 3. Eleven of these functions are assigned to the numerals 0-9 and the decimal point. A twelfth function designated C is used in the Estimated Time of Arrival mode to set the Present Time display to the proper present time. This is accomplished, as is well understood in the art, by depressing the C function which rapidly advances the Present Time display. When the actual present time is indicated by the display, the C function is released thereby causing the Present Time display to indicate the present chronological time at the usual rate. Four additional functions of keyboard 6 are not utilized in the Estimated Time of Arrival mode and comprise the divide (÷), multiply (×), substract (−), and add (+) functions, indicated in FIG. 3 by index numerals 7-10. The remaining four functions, designated in FIG. 3 as M, D, S and R control the input of data to the calculator in Estimated Time of Arrival mode.

The R function resets the calculator electronics to an initial or start state. The S function is used to enter the desired average speed data into the calculator. The D function is used to enter total distance information into the calculator. The M function is used to enter the desired maximum speed data into the calculator. The processing and flow of these various functions will be described in greater detail hereinbelow.

The output data interface for the calculator is furnished by present time display 11 and Estimated Time of Arrival and Calculator Results display 12. Present time display 11 may comprise a four digit seven segment LED or LCD which is used to provide a visual indication of the actual present time under the control of information received from microprocessor 1. As explained hereinbefore, present time display 11 may be set to the actual time by means of the C function of keyboard 6. Estimated Time of Arrival display 12 is a six digit seven segment LED or LCD. Only the four right hand digits of display 12 are used to indicate the estimated time of arrival when the calculator is being utilized in the Estimated Time of Arrival mode. As shown in FIG. 3, for the hypothetical programmed time, speed and distance perimeters described hereinbelow, display 11 is indicating a present time of 12:30, while display 12 is indicating an estimated time of arrival of 8:00. Additional indicators such as those at 13 and 14 may also be provided in association with displays 11 and 12 to aprise the operator whether the time being displayed is ante meridian (A.M.) or post meridian (P.M.). The tow left hand digits, illustrated at 15 and 16 of display 12, are only used when the calculator is being used in the Calculator mode in order to provide a six digit display.

Slide switch 17 is provided to select the desired operating mode of the calculator. In the CALC (Calculator) mode, the sixteen functions of keyboard 6 and the numerical indicators of display 12 operate in association with microprocessor 1 as a conventional four function calculator. When switch 17 is in the E T A (Estimated Time of Arrival) mode, the calculator operates to compute and display the estimated time of arrival at the desired destination based upon operator initiated input data and vehicle speed and distance data when switch 17 is in the CALC mode, data previously entered in the E T A mode will not be affected.

Turning to FIG. 1, the processing flow of the calculator is illustrated. Additionally it will be assumed that mode selection switch 17 is in the E T A position. The operator brings the storage registers to RAM 3 which, for purposes of an exemplary showing, will be designated as S, D, $P_1$, and E, to the reset or start state by activating keyboard function R. This operation also brings the internal processing circuitry of microprocessor 1 to the proper state for accepting and processing data. It will be observed that the register $T_p$, designated as 20 in FIG. 1 and associated with the present time clock, is not reset by the R function. The present time may be changed only by activating the C function as described hereinbefore.

The operator then proceeds to enter the desired average speed, total estimated distance and maximum speed information into the calculator. For example, let it be supposed that the operator estimates that the total distance to be travelled is three hundred miles and that he wishes to maintain an overall average speed of 40 miles per hour for the entire distance. In addition, let it be assumed that the operator at no time wishes to exceed a maximum speed of 55 miles per hours. Using these hypothetical perimeters, the operator enters the desired average speed data by depressing the numeric keyboard functions "4" and "0" followed by by function S. This operation causes the desired average speed data to be stored in one register of RAM 3 designated the S register. The operator then enters the total estimated distance to be travelled by depressing the numeric keyboard functions "3," "0," and "0," followed by the function D. This causes the total estimated distance data to be stored in a second register of RAM 3 designated by D register. The maximum speed information is entered in a similar manner by depressing the numeric function keys "5" and "5," followed by the function M, which causes the maximum speed data to be stored in register M of RAM 3, completing the operator initiated data input operations.

The present time information is produced by time generator 21 which may form a part of microprocessor 1. The circuitry comprising time generator 21 is entirely conventional and well understood to those skilled in the art. As described hereinbefore, present time display 11 may be set to the actual present time by activating keyboard function C as designated by "change time" block 22 in FIG. 1. The present time information produced by time generator 21 is stored in a register $T_p$ of RAM 3, as indicated by block 20 in FIG. 1, and also serves to drive Present Time display 11 as indicated by block 23.

Vehicle speed and distance data, indicated by block 24, is stored in a register $P_1$ of RAM 3. This information may be obtained from the vehicle speedometer and odometer, or may be produced by a separate transducer as described hereinabove. For example, the transducer may output a number of pulses proportional to the total distance that the vehicle has travelled, which will be stored in register $P_1$ as the actual distance travelled. The time rate of change of the distance pulses may be utilized to calculate the actual speed V of the vehicle, as depicted by block 25. Alternatively, the actual vehicle speed V may be obtained from data produced by the vehicle speedometer. The actual speed V information is stored in a V register of RAM 3, as indicated by block 26.

The distance remaining is calculated, as designated by block 27, by substracting the actual distance travelled by the vehicle stored in register $P_1$ from the total estimated distance to be travelled stored in register D. This result is stored in a register $P_2$ of RAM 3. The time to complete, depicted by block 28, is calculated by dividing the distance remaining stored in register $P_2$ by the desired average speed stored in register S. The result of this calculation is stored in a register E of RAM 3. The contents of register E and register $T_p$, representing the time to complete and the actual present time respectively, are added as illustrated by block 29, to produce the estimated time of arrival at the destination. This result may be displayed on display 12, as described hereinabove. The information stored in register M, representing the maximum desired speed is compared with the information stored in register V, representing the actual speed V of the vehicle in flow chart block 30. If the actual speed V is greater than the desired maximum speed M, a warning, such as an audible tone or flashing light (not shown), may be activated to warn the driver that he has exceeded his programmed maximum speed.

Using the hypothetical perimeters described hereinabove, let it be further assumed that the present time is 12:30 P.M. After the driver has entered the desired average speed, total estimated distance and maximum speed, as described, the calculator will proceed to automatically compute the estimated time of arrival. At the beginning of the trip, the distance remaining will be three hundred miles which will be stored in register $P_2$. The time to complete, calculated by dividing the distance remaining by the desired average speed as in block 28, will produce a result of seven hours thirty minutes. This result is added to the present time to produce an estimated time of arrival result of 8:00 P.M., which will be displayed on Estimated Time of Arrival display 12. As the vehicle progresses toward the destination, the calculator will continuously update the information and may modify the estimated time of arrival based upon the actual vehicle speed. For example, if the vehicle is actually proceeding at a rate of 50 miles per hour, after one hour of the trip has elapsed, the Estimated Time of Arrival display 12 will indicate an updated time of arrival of 7:45 P.M. This will indicate to the driver that he is running ahead of schedule. On the other hand, if the average speed during the first hour is only 30 miles per hour, the display 12 will indicate an updated time of 8:15 P.M. indicating that the driver is behind schedule.

It will be observed that initially the operator should select his desired average speed to include time losses caused by rest stops, anticipated traffic delays, etc. Thus the vehicle must be operated at an actual speed somewhat greater than the desired average speed. For example, let it be assumed that the total estimated distance to the destination is three hundred miles and that the driver wishes to maintain an actual speed of 50 miles per hour. In addition, the operators desires to include rest breaks totaling one and one half hours. Under these conditions, the operator may select a desired average speed of 40 miles per hours, which will produce an estimated time of arrival seven and one half hours later.

It will be understood that various changes in the details, materials, steps and arrangements of parts, which have herein been described and illustrated in order to explain the nature of the invention, may be made by those skilled in the art within the principle and scope of the invention as expressed in the appended claims. While one form of data processing has been described for purposes of an exemplary showing to calculate the estimated time of arrival based on certain operator initiated and vehicle parameters, other processing configurations are contemplated as being within the present invention. For example, an alternative processing scheme may be used to calculate the estimated time of arrival from information reflecting the quotient of the actual distance travelled and the difference between the actual speed and the desired average speed, summed with the present time.

The embodiments of the invention in which an exclusive privilege or property is claimed are defined as follows:

1. An estimated time of arrival calculator for computing the estimated time of arrival of a vehicle or the like at a desired destination from information reflecting the total estimated distance and the desired average speed to be travelled to the destination supplied by an operator and from information reflecting the present chronological time and the actual distance travelled by the vehicle, the calculator comprising:
   (a) memory means having a plurality of storage locations for storing digital information;
   (b) means for entering into said memory means the information reflecting the total estimated distance and the desired average speed to be travelled to the destination;
   (c) clock means for generating information reflecting the present chronological time;
   (d) calculating means responsive to said memory means and said clock means for computing the estimated time of arrival at the destination from information reflecting the total estimated distance to the destination, the desired average speed, the actual distance travelled and the present chronological time; and
   (e) means responsive to said calculating means for displaying the estimated time of arrival.

2. The calculator according claim 1 including means for displaying the actual present chronological time.

3. The calculator according to claim 2 including means for setting said actual present chronological time display means to the actual chronological time.

4. The calculator according to claim 1 wherein said means for entering comprises a keyboard having numeric entry functions and control functions for entering information reflecting the total distance estimated to the destination and the desired average speed.

5. The calculator according to claim 1 including a transducer in association with the vehicle for supplying information reflecting the total distance travelled.

6. The calculator according to claim 1 wherein said calculating means includes:

(a) means for calculating the distance remaining to the destination from information reflecting the total estimated distance and from information reflecting the actual distance travelled;
(b) means for calculating a time to complete from the distance remaining and desired average speed; and
(c) means for calculating the estimated time of arrival from the time to complete and present chronological time.

7. The calculator according to claim 1 including means for entering information reflecting a desired maximum speed into said memory means, and means for providing an indication when the desired maximum speed has been exceeded by the vehicle.

* * * * *